United States Patent
Lane et al.

(10) Patent No.: US 7,116,821 B2
(45) Date of Patent: Oct. 3, 2006

(54) COLOR TRAPPING FOR AN IMAGE FORMING APPARATUS

(75) Inventors: David K. Lane, Stamping Ground, KY (US); Ning Ren, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 961 days.

(21) Appl. No.: 10/105,660

(22) Filed: Mar. 25, 2002

(65) Prior Publication Data
US 2003/0179394 A1 Sep. 25, 2003

(51) Int. Cl.
*G06K 9/34* (2006.01)

(52) U.S. Cl. .................................. 382/178; 382/180

(58) Field of Classification Search ............... 358/3.15; 382/178, 180, 199, 201, 203, 258, 266
See application file for complete search history.

(56) References Cited

U.S. PATENT DOCUMENTS

| | | | |
|---|---|---|---|
| 5,016,189 A | 5/1991 | Yamada | |
| 5,016,194 A | 5/1991 | Matsushita et al. | |
| 5,020,005 A | 5/1991 | Fujii | |
| 5,050,101 A | 9/1991 | Kiuchi et al. | |
| 5,201,027 A | 4/1993 | Casini | |
| 5,237,646 A | 8/1993 | Bunce | |
| 5,241,396 A | 8/1993 | Harrington | |
| 5,295,236 A | 3/1994 | Bjorge et al. | |
| 5,297,243 A | 3/1994 | Shiotani et al. | |
| 5,313,570 A | 5/1994 | Dermer et al. | |
| 5,440,652 A | 8/1995 | Ting | |
| 5,513,300 A | 4/1996 | Shibazaki | |
| 5,542,052 A * | 7/1996 | Deutsch et al. ............. | 345/589 |
| 5,553,205 A | 9/1996 | Murray | |
| 5,574,833 A | 11/1996 | Yoshiaki | |
| 5,581,667 A * | 12/1996 | Bloomberg ................. | 358/1.9 |
| 5,598,513 A | 1/1997 | Anzai | |
| 5,613,046 A | 3/1997 | Dermer | |
| 5,666,478 A | 9/1997 | Nishikawa | |
| 5,666,543 A | 9/1997 | Gartland | |
| 5,668,931 A | 9/1997 | Dermer | |
| 5,691,759 A | 11/1997 | Hanson | |
| 5,706,414 A | 1/1998 | Pritchard | |
| 5,715,382 A | 2/1998 | Herregods et al. | |
| 5,737,088 A | 4/1998 | Coleman | |
| 5,740,338 A | 4/1998 | Gauthier et al. | |
| 5,748,797 A | 5/1998 | Sakai et al. | |
| 5,748,860 A | 5/1998 | Shively | |
| 5,754,164 A | 5/1998 | Yutani et al. | |
| 5,774,636 A | 6/1998 | Sousa | |
| 5,777,758 A | 7/1998 | Tanabe | |
| 5,778,158 A | 7/1998 | Fuji et al. | |
| 5,784,172 A | 7/1998 | Coleman | |
| 5,790,764 A | 8/1998 | Suzuki | |
| 5,806,430 A | 9/1998 | Rodi | |
| 5,819,655 A | 10/1998 | Delivenneri et al. | |
| 5,848,180 A | 12/1998 | Coleman | |
| 5,848,225 A | 12/1998 | Nickell et al. | |

(Continued)

*Primary Examiner*—Jerome Grant, II

(57) ABSTRACT

The present invention is directed a method of color trapping. In one embodiment, the color trapping is performed during the rasterization process. The color trapping comprises identifying page objects into a variety of different categories. Color trapping for each of the page objects is then performed based on specific procedures for the category. In one embodiment, the categories include identifying the page objects as rectangles, characters, and non-rectangular shapes. In one embodiment, specific page objects may be identified as being of a type that color trapping is not to be performed.

40 Claims, 10 Drawing Sheets

U.S. PATENT DOCUMENTS

| | | | |
|---|---|---|---|
| 5,923,821 A * | 7/1999 | Birnbaum et al. | 358/1.9 |
| 5,960,163 A | 9/1999 | Nickell et al. | |
| 6,018,400 A | 1/2000 | Blair | |
| 6,031,544 A * | 2/2000 | Yhann | 345/620 |
| 6,031,630 A | 2/2000 | Blair et al. | |
| 6,039,434 A | 3/2000 | Moroney | |
| 6,067,405 A | 5/2000 | Serra | |
| 6,084,684 A | 7/2000 | Hamburg et al. | |
| 6,088,122 A | 7/2000 | Coleman | |
| 6,088,130 A | 7/2000 | Matsukubo | |
| 6,088,476 A | 7/2000 | Shimamura | |
| 6,088,477 A | 7/2000 | Ohta et al. | |
| 6,141,114 A | 10/2000 | Mantell et al. | |
| 6,157,462 A | 12/2000 | Fan | |
| 6,169,609 B1 | 1/2001 | Jacob et al. | |
| 6,176,566 B1 | 1/2001 | Amidei | |
| 6,192,152 B1 | 2/2001 | Funada et al. | |
| 6,222,642 B1 | 4/2001 | Farrell et al. | |
| 6,229,554 B1 | 5/2001 | Matsuzuki | |
| 6,229,623 B1 | 5/2001 | VerMurlen | |
| 6,236,754 B1 * | 5/2001 | Harrington | 382/199 |
| 6,259,536 B1 | 7/2001 | Coleman | |
| 6,262,747 B1 | 7/2001 | Rocheleau et al. | |
| 6,275,302 B1 | 8/2001 | Coleman | |
| 6,296,343 B1 | 10/2001 | Alfaro | |
| 6,515,763 B1 * | 2/2003 | Dermer et al. | 358/1.9 |
| 6,518,964 B1 * | 2/2003 | Suits et al. | 345/419 |
| 6,594,030 B1 * | 7/2003 | Ahlstrom et al. | 358/1.15 |
| 6,697,078 B1 * | 2/2004 | Becker et al. | 345/589 |
| 6,961,067 B1 * | 11/2005 | Moore | 345/589 |
| 6,970,271 B1 * | 11/2005 | Estrada et al. | 358/1.9 |
| 2001/0033686 A1 * | 10/2001 | Klassen | 382/167 |
| 2003/0179394 A1 * | 9/2003 | Lane et al. | 358/1.9 |
| 2004/0212628 A1 * | 10/2004 | Becker et al. | 345/620 |

* cited by examiner

COLOR TRAPPING FOR AN IMAGE FORMING APPARATUS

BACKGROUND OF THE INVENTION

In describing the position of objects on a page, objects are often superimposed over a background color. In the area a foreground object will occupy, the background color is removed leaving a knockout. A typical case is black text placed on top of a colored background. Since the black character is in the foreground, the background color behind it is knocked out. When printed, misalignment of the black plane can shift the character relative to its background knockout and allow the bare media sheet to show through the gap. This produces objectionable outlines around one or more sides of the character and even reduces legibility. Color trapping is a technique used to minimize the show through and may include spreading and choking. Spreading refers to expanding regions of a particular color beyond its normal boundaries. Choking refers to contracting a color region so that a small overlap exists between graphical regions where misregistration may occur.

Prior art patents disclose a color trapping technique that performs color trapping after the page was completely rendered. The methods include searching for boundaries between the various colors and using various trapping techniques. This is referred to as backend color trapping as the page is initially formed and then modified via color trapping. Backend color trapping requires an extra step because the color trapping is determined based on the initially formed page.

Prior art methods also trap different object types in the same manner. Therefore, a character is trapped in the same manner as other objects. The trapping simply identifies the boundaries between color and traps with one type of pre-determined logic. This broad-brush approach may cause significant color shifts and irregularities in the halftone screens.

SUMMARY OF THE INVENTION

The present invention is directed to methods of performing color trapping. In one embodiment, a method of color trapping page objects in an image forming apparatus comprises receiving a page object in a page description at an image forming controller, the page description defining the page object as either edge lists or a bitmap. A first trapping technique is performed when the page description defines the page object as the edge lists, and a second trapping technique is performed when the page description defines the page object as the bitmap.

In another embodiment of color trapping within an image forming apparatus, the steps include receiving a request comprising a page object that is executable by a image forming controller. The page object is identified as being one of a character, rectangle, and non-rectangular shape. It is then determined whether trapping is necessary for the page object, and if trapping is necessary, performing trapping according to the category of the page object.

In one embodiment, the method of color trapping page objects during a rasterization process comprises the steps of receiving a page object at an image forming controller, and categorizing the page object into one of a first category or a second category. When the page object is categorized into the first category, color trapping is performed using edge lists of the page object. When the page object is categorized into the second category, color trapping is performed using a bitmap of the page object.

Another embodiment comprises performing color trapping of a character. The steps include obtaining a bitmap of a character, producing a modified bitmap of the character, selecting either the bitmap or the modified bitmap as the foreground representation, and selecting the other of the bitmap or the modified bitmap as the background representation.

In this embodiment, the step of producing the modified bitmap of the character may include eroding the bitmap by removing at least one pixel from the bitmap. The step of eroding the bitmap may comprise shifting the bitmap by at least one pixel, and performing a bitwise AND operation between the bitmap and a shifted bitmap to remove at least one pixel not contained in an overlap between the bitmap and the shifted bitmap. In one embodiment, the eroded bitmap is selected as the background representation of the character.

The method may further include spreading the bitmap to add at least one pixel to the bitmap. In one embodiment, the step of spreading the bitmap comprises shifting the bitmap by at least one pixel and performing a bitwise OR operation between the bitmap and the shifted bitmap to add the at least one pixel not contained in an overlap between the bitmap and the shifted bitmap. The spread bitmap may be selected as a foreground representation of the character.

In another embodiment, the method of performing color trapping of a character comprises the steps of obtaining a bitmap representation of a character, producing a first modified bitmap representation of the character, producing a second modified bitmap representation of the character, selecting one of the first and second modified bitmap representations of the character as a foreground representation, and selecting the other of the first and second modified bitmap representations of the character as a background representation.

In one embodiment of the present invention, the method comprises performing color trapping of a rectangle which includes obtaining a height and a width of a rectangle, producing a modified height and a modified width of the rectangle, selecting one of the height and the width or the modified height and the modified width as a foreground representation, and selecting the other of the height and the width or the modified height and modified width as a background representation. The step of producing the modified height and modified width of the rectangle may include decreasing at least one of the height and the width resulting in rectangular dimensions that are smaller than the rectangle. The modified height and the modified width may be selected as the background representation. The step of producing the modified height and the modified width may include increasing at least one of the height and the width resulting in increased rectangular dimensions that are larger than the rectangle. The increased rectangular dimensions may be selected as the foreground representation of the character.

In another embodiment, a method of performing color trapping of a rectangle comprises obtaining a height and a width of a rectangle, producing a first dimension of the rectangle comprising a first modified height and a first modified width, producing a second dimension of the rectangle comprising a second modified height and a second modified width of the rectangle, selecting one of the first dimension and the second dimension as a foreground representation of the rectangle, and selecting the other of the first dimension and the second dimensions as a background representation of the rectangle. In one embodiment, producing either the first dimension or the second dimension of the rectangle may include choking an overall size of the rectangle by shrinking at least one of the height and the width. Producing either the first dimension or the second dimension of the rectangle may include spreading an overall size of the rectangle by expanding at least one of the height and the width.

Another embodiment is a method of performing color trapping of a non-rectangular shape comprising obtaining edge lists representing a non-rectangular shape, producing modified edge lists representing the non-rectangular shape, selecting either the edge lists or the modified edge lists as the foreground representation, and selecting the other of the edge lists or the modified edge lists as the background representation. The edge lists define a region and the step of producing the modified edge lists may comprise reducing or increasing the region. In one embodiment, the edge lists comprises an array of first coordinates and an array of second coordinates, and the step of producing the modified edge lists may include altering at least one of the array of first coordinates or the array of second coordinates.

In one embodiment, the step of producing the modified edge lists may include dividing the non-rectangular shape into a plurality of subsections and obtaining subsection edge lists for each of the plurality of subsections.

In another embodiment, a method of performing color trapping of a non-rectangular shape comprises obtaining edge lists representing a non-rectangular shape, producing first modified edge lists representing the non-rectangular shape, producing second modified edge lists representing the non-rectangular shape, selecting one of the first and second modified edge lists of the non-rectangular shape as a foreground representation, and selecting the other of the first and second modified edge lists of the non-rectangular shape as a background representation.

DETAILED DESCRIPTION

The present invention is directed a method of color trapping. In one embodiment, the color trapping is performed during the rasterization process. The color trapping identifies page objects as being from one of a variety of different categories. Color trapping for each of the page objects is then performed based on specific procedures for the category. In one embodiment, the categories include identifying the page objects as rectangles, characters, and non-rectangular shapes. Page objects may further be identified as being of a type that color trapping is not to be performed, such as a raster image.

Figure 1:
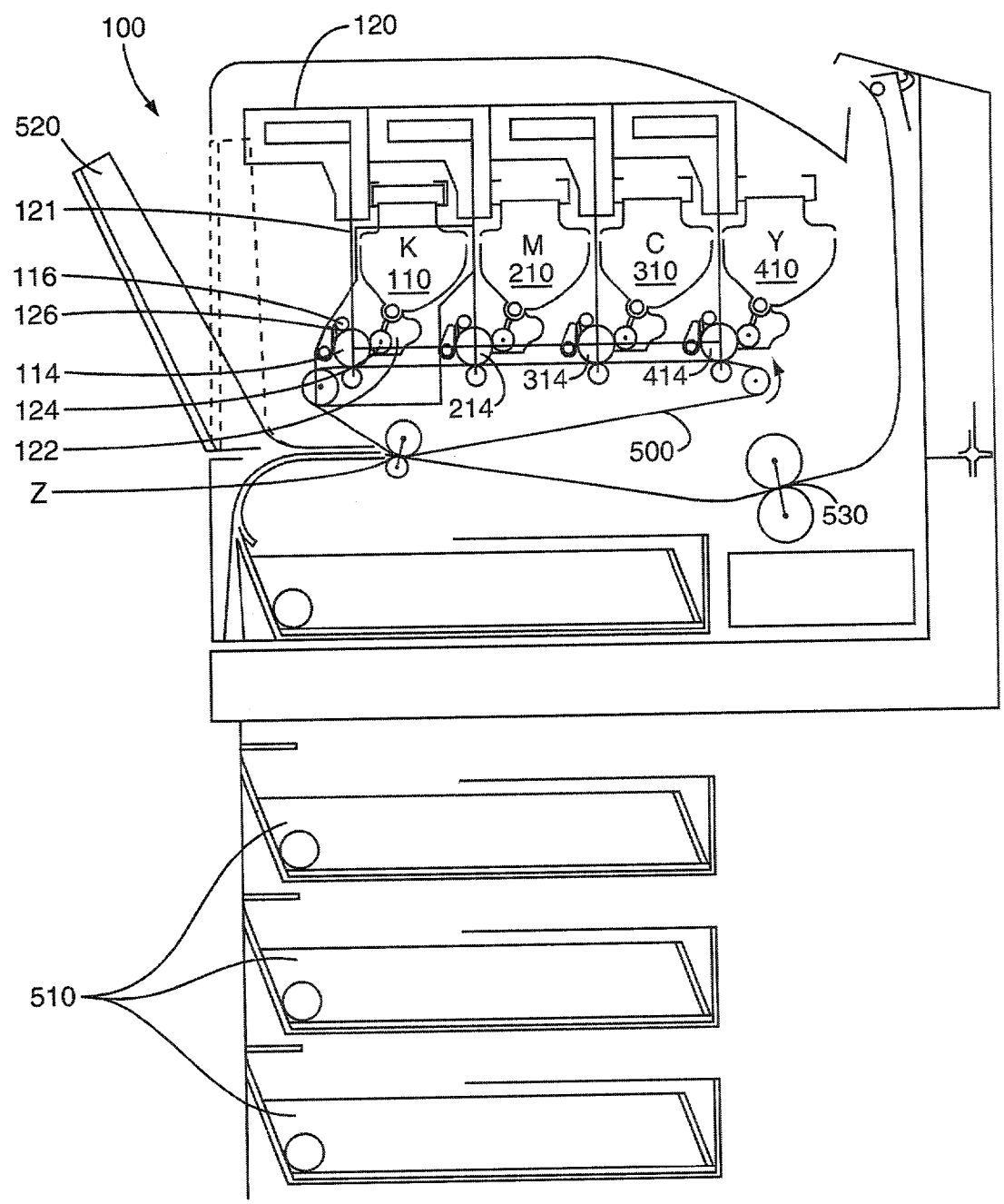
FIG. 1 is a side view of an image forming apparatus according to one embodiment of the present invention.

FIG. 1 illustrates the basic elements of one embodiment of an image forming apparatus and is incorporated for an understanding of the overall electrophotographic image forming process. A four cartridge color laser printer is illustrated as 100, however one skilled in the art will understand that the present invention is applicable to other types of image forming devices. The image forming apparatus, generally designated 100, includes a plurality of similar image forming units 110, 210, 310, and 410. Each image forming unit is of a similar construction but is distinguished by the toner color contained therein. In the preferred embodiment, the device includes a black (K) unit 110, a magenta (M) unit 210, a cyan (C) unit 310, and a yellow (Y) unit 410. Each different color toner forms an individual image of a single color that is combined in layered fashion to create the final multi-colored image.

Each of the image forming units is substantially identical and includes a photoconductor, a developer device, and a cleaning device. As the units are identical except for the toner color, the unit and elements for forming black images will be described, with the other color image forming units being omitted for simplification.

The photoconductor 114 is generally cylindrically-shaped and has a smooth surface for receiving an electrostatic charge over the surface as the photoconductor rotates past charger 116. The photoconductor 114 uniformly rotates past a scanning laser 120 directed onto a selective portion of the photoconductor surface forming an electrostatically latent image across the width of the photoconductor representative of the outputted image. The photoconductor 114 rotates continuously so as to advance the photoconductor about 1/600$^{th}$ or 1/1200$^{th}$ of an inch between laser scans. This process continues as the entire image pattern is formed on the photoconductor surface.

After receiving the latent image, the photoconductor 114 rotates to the developer which has a toner bin, illustrated generally as 122 in FIG. 1, for housing the toner and a developer roller 124 for uniformly transferring toner to the photoconductor. The toner is transferred from the toner bin 122 to the photoconductor 114. The toner is a fine powder usually constructed of plastic granules that are attracted and cling to the areas of the photoconductor 114 that have been discharged by the laser scanning assembly 120.

The photoconductor 114 next rotates past an adjacently-positioned intermediate transport mechanism belt 500 (hereinafter, ITM belt) to which the toner is transferred from the photoconductor 114. As illustrated in FIG. 1, the ITM belt 500 is endless and extends around a series of rollers adjacent to the photoconductors. The ITM belt 500 and each photoconductor 114, 214, 314, 414 are synchronized providing for the toner from each photoconductor to precisely align on the ITM belt 500 during a single pass. By way of example as viewed in FIG. 1, the yellow toner will be placed on the ITM belt, followed by cyan, magenta, and black.

After depositing the toner on the ITM belt, the photoconductor 114 rotates through a cleaning area where residual toner is removed from the surface via a brush or scraper 126. The residual toner is moved along the length of the photoconductor 114 to a waste toner reservoir 109 where it is stored until the cartridge is removed from the image forming apparatus and disposed. In one embodiment, the photoconductor 114 further passes through a discharge area (not shown) having a lamp or other light source for exposing the entire photoconductor surface to light to remove any residual charge and image pattern formed by the laser.

As the photoconductors are being charged and gathering toner, a recording sheet, such as a blank sheet of paper, is being routed to intercept the ITM belt 500. The paper may be placed in one of the lower trays 510, or introduced into the image forming device through a side track tray 520. A series of rollers and belts transport the paper to point Z where the sheet contacts the ITM belt 500 and receives the toner. The sheet may receive an electrostatic charge prior to contact with the ITM belt to assist in attracting the toner from the belt. The sheet and attached toner next travel through a fuser 530 having a pair of rollers and a heating element that heats and fuses the toner to the sheet. The paper with fused image is then transported out of the printer for receipt by a user.

Color trapping is a technique that uses choking and spreading to minimize show through that may be formed around an object printed in the foreground of a print. Spreading refers to expanding regions of a particular color beyond its normal boundaries. Choking refers to contracting a color region so that a small overlap exists between graphical color regions where misregistration may occur. Color trapping is performed to compensate for misalignment between overlapping graphical objects produced by the image forming units 110, 210, 310, and 410.

Figure 2:
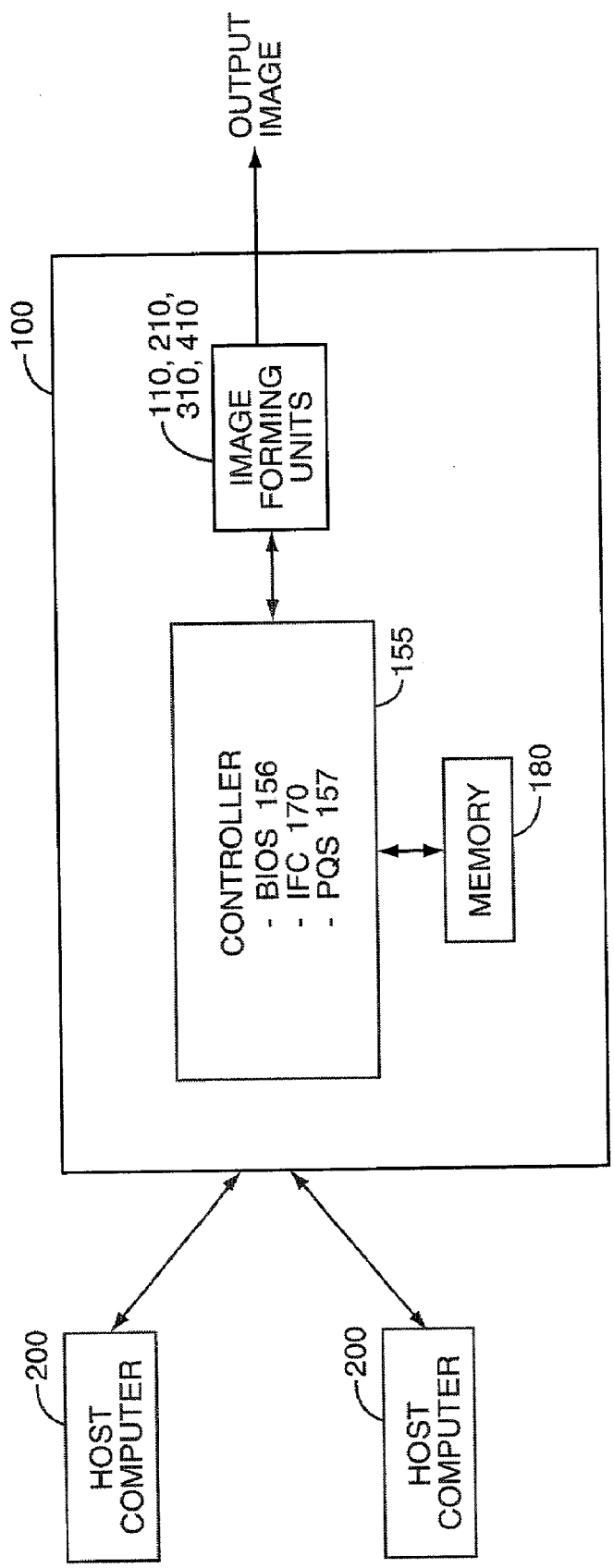
FIG. 2 is a schematic diagram of the host computer sending page description to the image forming controller according to one embodiment of the present invention.

FIG. 2 illustrates a schematic diagram of one embodiment of the host computers 200 and image forming unit 100. A plurality of host computers 200 send requests to a controller 155 of the image forming unit 100. The request includes page description data for producing the output page image and may include the layout of the page including the position of the objects on the page, font size, style, colors, and other scaling operations. One embodiment of the page description is POSTSCRIPT by Adobe Systems, Incorporated. In one embodiment as illustrated in FIG. 2, the controller 155 comprises: a basic input/output system (BIOS) 156 managing a user interface, engine interface, and input/output drivers; an image forming controller (IFC) 170 having language processors and graphics subsystem library; and a page queuing system (PQS) 157. Memory 180 may be associated with the controller 155 for storing page formations. In one embodiment, character bitmaps are saved in memory 180 for use on a future print request. Saving the bitmaps in memory 180 speeds processing time as the IFC 170 does not calculate new bitmaps, but rather recalls repetitive bitmaps that are the same as those previously calculated and saved. One skilled in the art will understand that there are various embodiments for the IFC 170 which are to be included herein and the description and illustration of FIG. 2 are included as an example of one embodiment.

Figure 3:
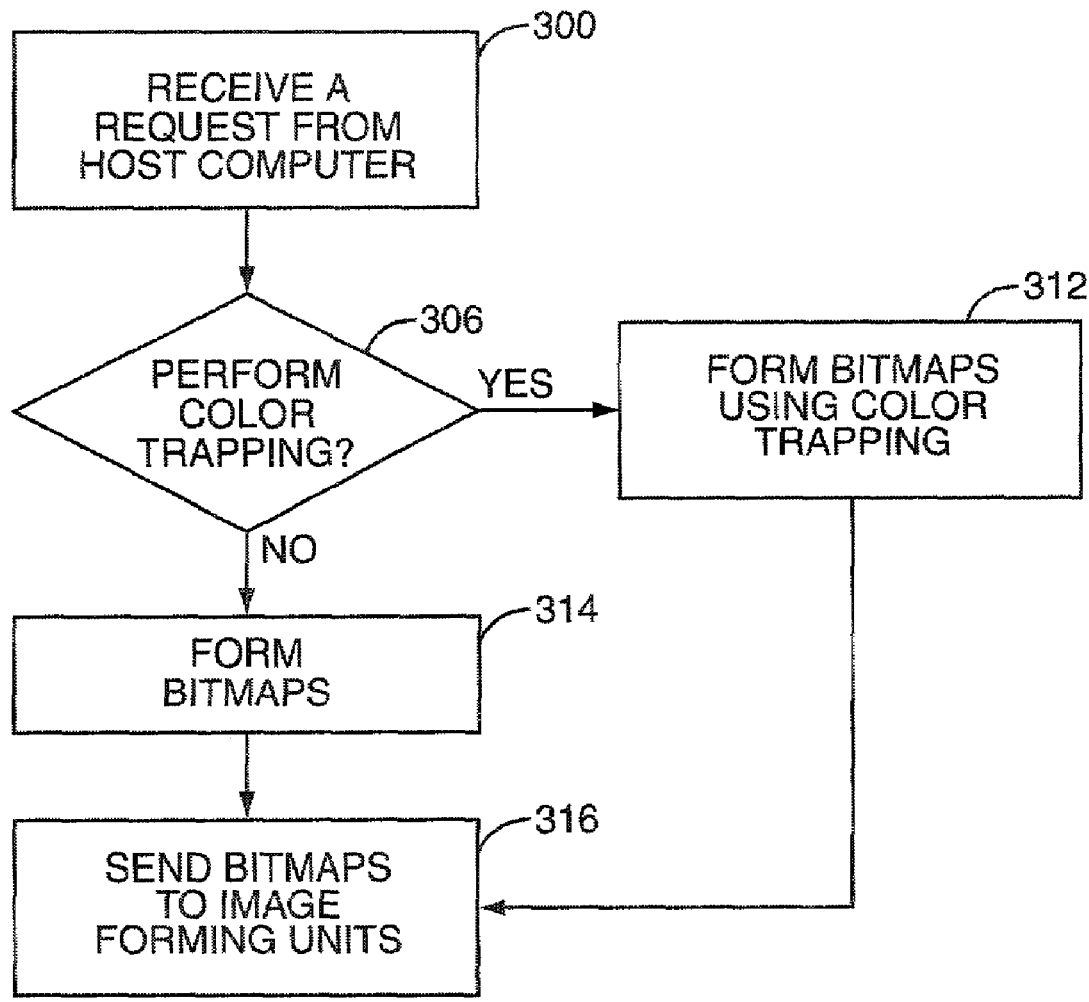
FIG. 3 is a flowchart diagram of the steps of receiving and processing a request from a host computer according to one embodiment of the present invention.

FIG. 3 illustrates the steps of forming color trapping. The data flow starts when a page description is delivered by a host computer 200 to the BIOS 156 of the controller 155 (step 300). The data is routed to the IFC 170 where it is determined whether color trapping is necessary (step 306). If color trapping is required (step 312), the data is converted into page images with data broken into objects. If color trapping is not required (step 314), the process is similar except that the page image is formed without color trapping. In both embodiments, the raster image data is forwarded to the image forming units 110, 210, 310, 410 for image formation (step 316).

Figure 4:
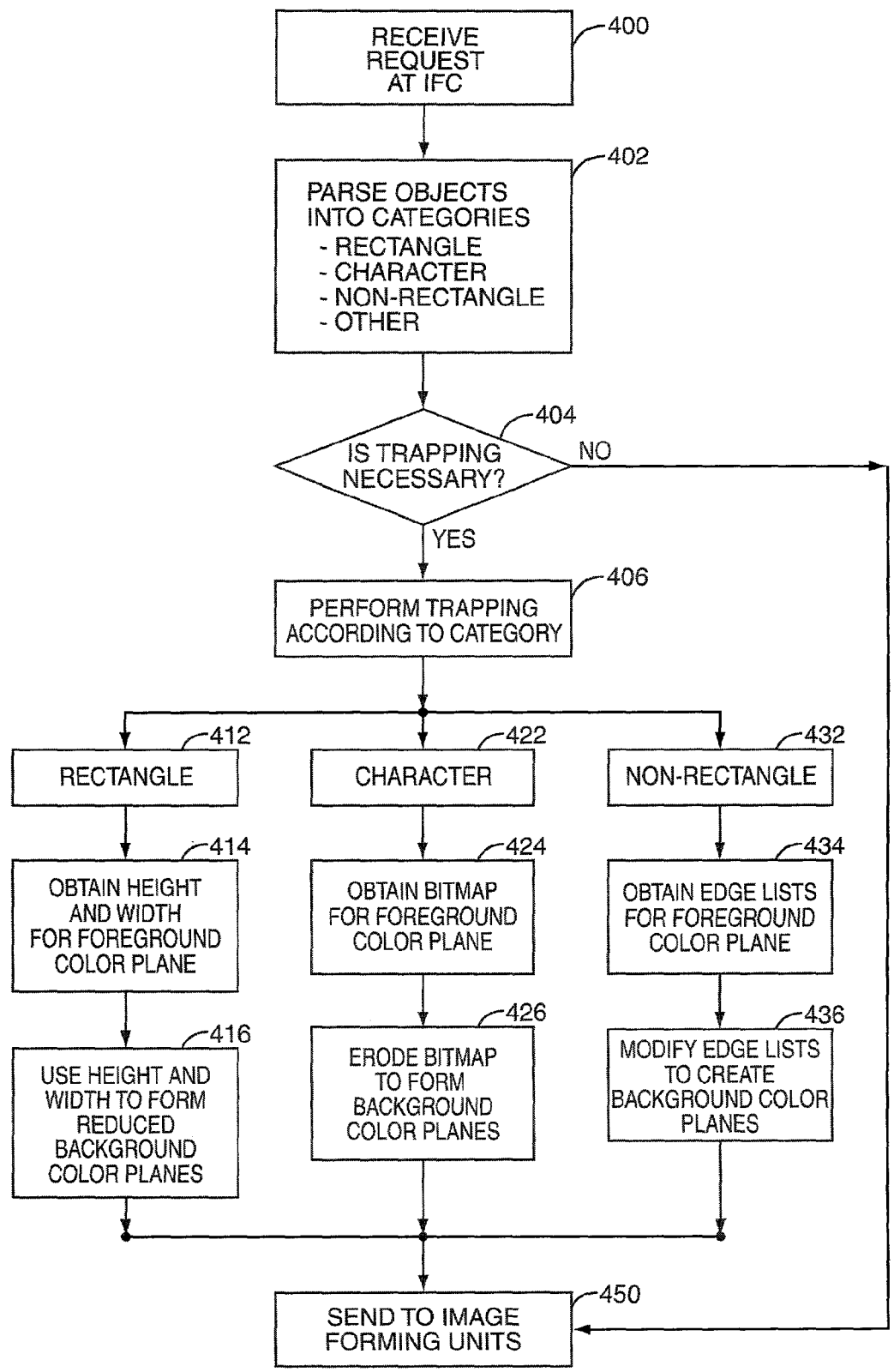
FIG. 4 is a flowchart diagram of the steps of color trapping according to one embodiment of the present invention.

FIG. 4 illustrates the steps of color trapping of different categories of page objects according to one embodiment of the present invention. The method starts when the page description is received at the IFC 170 (step 400).

The page objects are parsed and categorized (step 402). In one embodiment, each page object is identified as being a rectangle, character, non-rectangle, or other. It is determined whether color trapping is necessary (step 404). In one embodiment, the user may opt not to have color trapping performed. In yet another embodiment, the object is a photograph and color trapping is not performed. These objects are rendered without color trapping and sent to the image forming units 110, 210, 310, 410. Once the page objects are categorized, color trapping is performed according to the category of the page object (step 406).

Rectangles are identified by the height and width dimensions (steps 412 and 414). The dimensions are used as a template for forming the bitmap for the foreground object. In one embodiment, the dimensions of the foreground bitmap are the same as the height and width dimensions. In another embodiment, the dimensions of the foreground bitmap are increased to dimensions larger than the template. Increasing the dimensions may include increasing the height, increasing the width, or increasing both. In one embodiment, it is necessary to translate the height and width to re-center the object relative to the position of the original dimensions.

Figure 5:
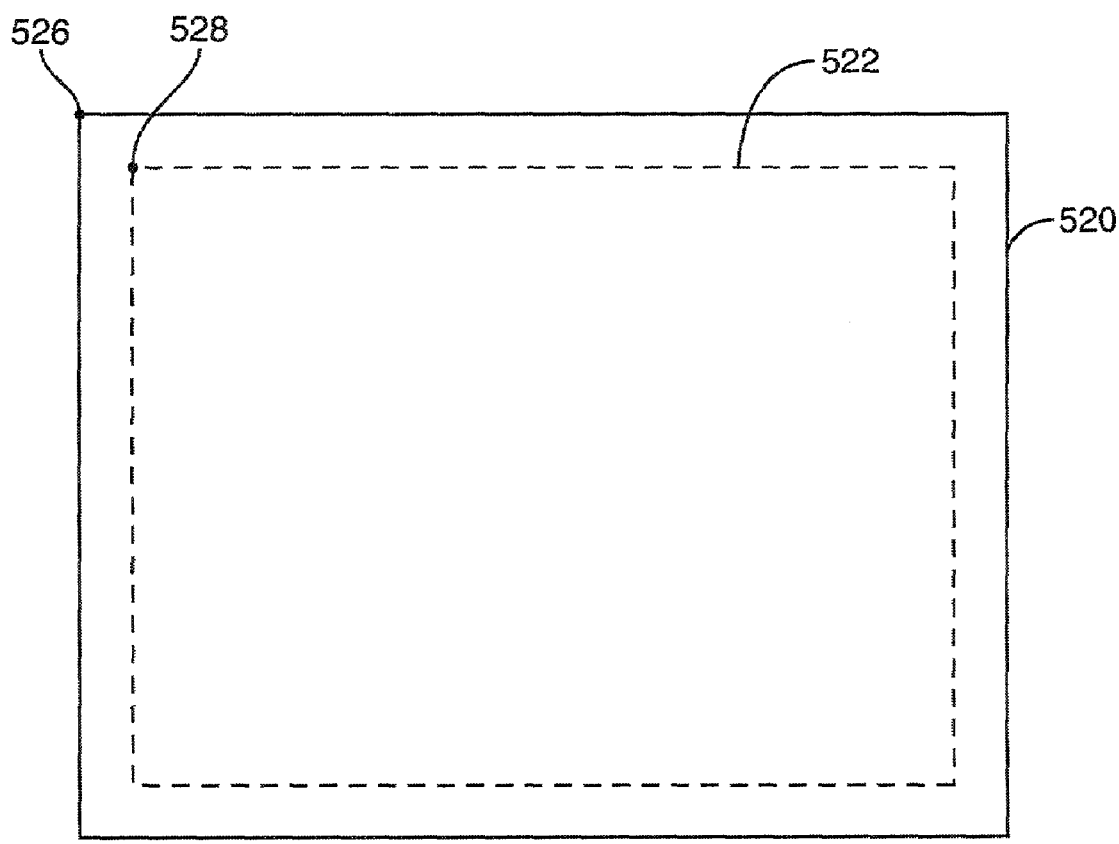
FIG. 5 is a schematic diagram illustrating foreground color planes of a rectangular object and background color planes according to one embodiment of the present invention.

The bitmaps for the background color planes for rectangles are formed by creating cut-outs of the foreground color and decreasing the edges inward forming a rectangle of smaller dimensions. Decreasing the edges may include decreasing the height, decreasing the width, or both. One embodiment of decreasing both the height and the width is illustrated in FIG. 5. The foreground rectangle 520 is larger than the bitmap perimeter of the background color planes 522. The amount of reduction of the background bitmaps may vary depending upon the specific requirements of the request and the printer mechanics. In one embodiment, the dimensions of the background planes are reduced 2 pels on each edge. The decreased background planes 528 are then re-centered relative to the foreground plane 520 by translating the origin 526 to a new position at 528. The origin is a point on the surface of the object.

Figure 8A:
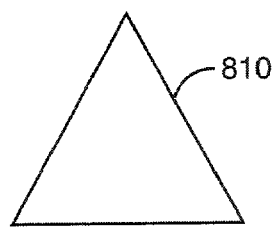
FIG. 8A is a schematic diagram illustrating a character object.
Figure 8B:
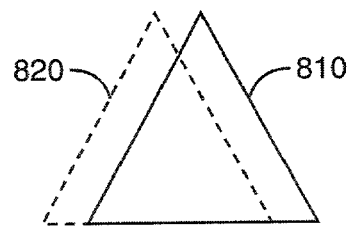
FIGS. 8B–8F are schematic diagrams illustrating a bit-wise OR operation for forming spread color planes according to one embodiment of the present invention.
Figure 8C:
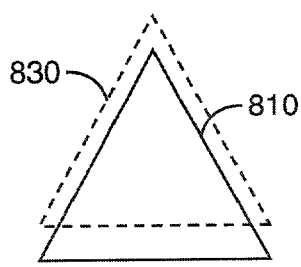
Figure 8D:
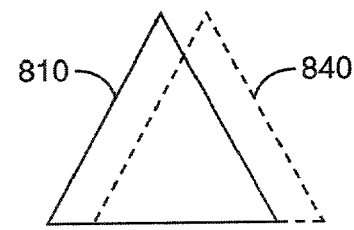
Figure 8E:
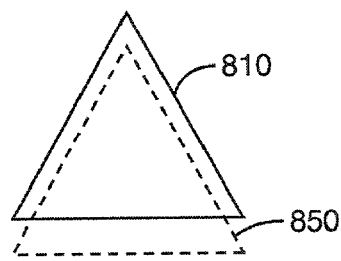
Figure 8F:
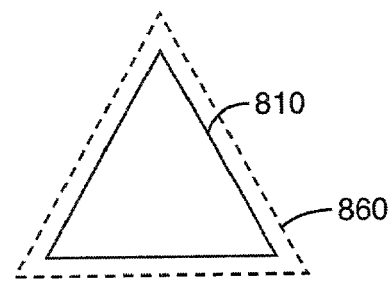

Character objects are another identified category (step 422). Characters may include alphanumeric figures, symbols, punctuation marks, and other repetitively formed objects. A bitmap of the character to be trapped is obtained from, generated from, or selected by the page description sent to the IFC 170 (step 424). In one embodiment, the bitmap of the foreground color plane is formed using the bitmap as a template. In another embodiment, the foreground bitmap is spread. In one spreading embodiment, at least one pixel is added to the original bitmap. In another spreading embodiment, a number of pels are added to enlarge the bitmap. In yet another embodiment, a bitwise OR operation is performed by shifting the unmodified template a number of pels in various directions. A spread bitmap is formed comprising the original bitmap and the pels that are not contained in the overlap between the original and shifted bitmap. This process is illustrated in FIGS. 8B–8F using a triangle symbol. FIG. 8A illustrates the unmodified bitmap 810 of the triangle. The unmodified bitmap 810 is moved a number of pels in each direction as illustrated as 820 in FIG. 8B (left), 830 in FIG. 8C (upward), 840 in FIG. 8D (right), and 850 in FIG. 8E (downward). The results of each of the movements are combined in a bitwise OR operation to form an enlarged bitmap as illustrated in FIG. 8F. The amount of movement and directions may vary.

Figure 6A:
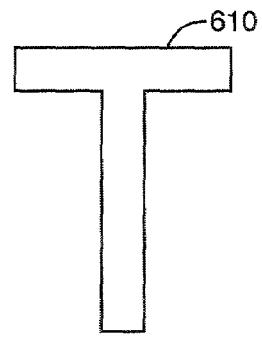
FIG. 6A is a schematic diagram of a character object in page description for forming a foreground color plane.
Figure 6B:
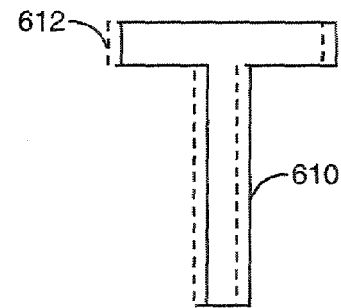
FIGS. 6B–6E are schematic diagrams of forming a bit-wise AND operation to form background color planes according to one embodiment of the present invention.
Figure 6C:
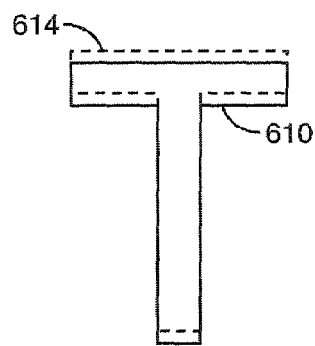
Figure 6D:
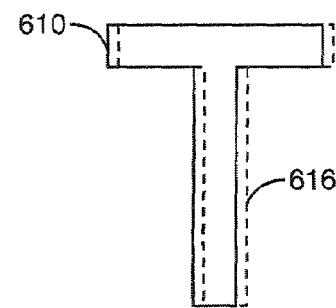
Figure 6E:
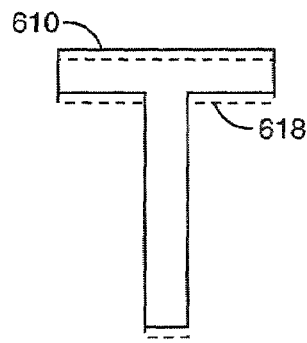
Figure 6F:
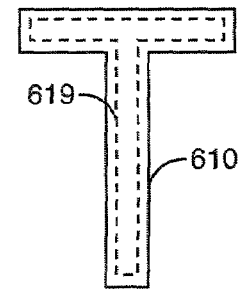
FIG. 6F is the foreground color plane and background color plane of a character object according to one embodiment of the present invention.

Character bitmaps for the background color planes may be formed by eroding the original bitmap. In one embodiment, at least one pixel is removed from the original bitmap to form the background bitmaps. In another embodiment, a number of pixels are removed from the original bitmap. In yet another embodiment, a bitwise AND operation is performed based on the original bitmap. FIGS. 6B through 6F illustrate one embodiment of the bitwise AND operation creating the background color planes. FIG. 6A illustrates the original bitmap for the character "T" 610. The original bitmap 610 is shifted a number of pels in each direction as illustrated as 612 in FIGS. 6B (left), 614 in FIG. 6C (upward), 616 in FIG. 6D (right), and 618 in FIG. 6E (downward). In the embodiment illustrated, the bitmap is moved two pels in each direction. The results of each of the movements are combined in a bitwise AND operation to form the bitmaps for the background color planes. The bitmaps for the foreground color plane 610 and background color plane 619 are illustrated in FIG. 6F. The amount of movement and directions of movement may vary depending upon the desired results.

Non-rectangular objects are another identified category (step 432). Non-rectangular objects are defined by edge lists within the page description. In one embodiment, the edge lists include an array of first coordinates and an array of second coordinates that define the shape of the non-rectangular object. In one embodiment, the first and second coordinates are left and right along a scan line. In one embodiment, the bitmap of the foreground color plane is formed by the edge list (step 434).

Figure 9A:
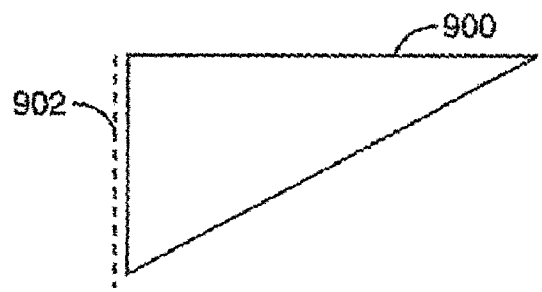
FIG. 9A is a schematic diagram illustrating a non-rectangular shape having a first edge list increased.
Figure 9B:
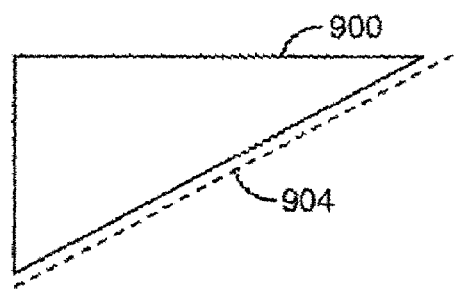
FIG. 9B is a schematic diagram illustrating a non-rectangular shape having a second edge list increased.
Figure 9C:
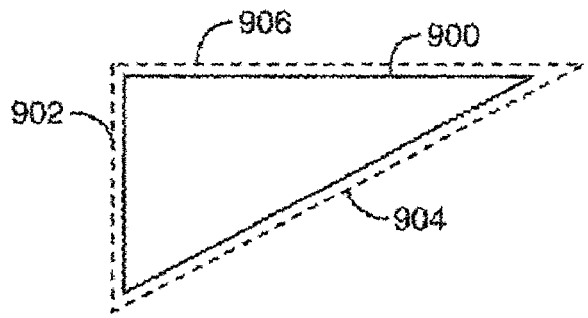
FIG. 9C is a schematic diagram illustrating a non-rectangular shape having first and second edge lists increased and a top edge grow beyond the dimensions of the original shape.

In another embodiment of forming the foreground bitmap for non-rectangular shapes comprises increasing the edge lists. One embodiment is illustrated in FIG. 9A in which the original edge lists indicated by shape 900 is spread by modifying a first edge list 902. In one embodiment, the movement of the edge list is termed relative to one side of the page. Using the left side of the page as the starting coordinates and increasing the further the point is from the left margin, FIG. 9A illustrates reducing the left edge list. The shape is then translated as necessary to re-center the position. In another embodiment illustrated in 9B, the second edge list 904 is modified (i.e., the right edge list is increased). FIG. 9C illustrates another embodiment of increasing both dimensions of the shape 900. The first edge list 902 and second edge list 904 are modified. In one embodiment, the remaining edges such as the top and bottom edges are replicated at increased dimensions. Members may be added to each of the edge lists to grow the dimensions of the shape as necessary. Therefore, line 906 is a replication of the original top edge of shape 900. Further, it may be necessary to translate the edge lists as necessary to re-center the object.

Figure 10A:
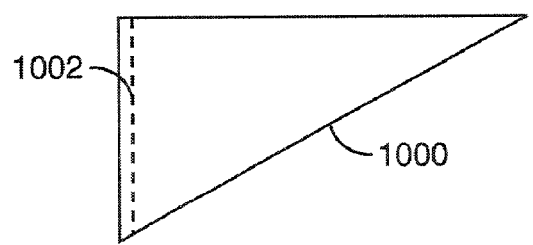
FIG. 10A is a schematic diagram illustrating a non-rectangular shape having a first edge list decreased.
Figure 10B:
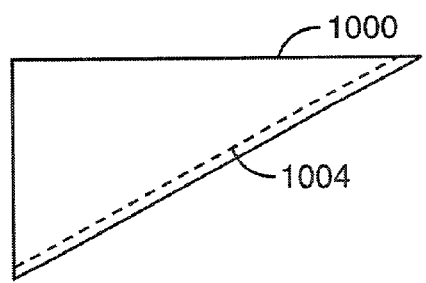
FIG. 10B is a schematic diagram illustrating a non-rectangular shape having a second edge list decreased.
Figure 10C:
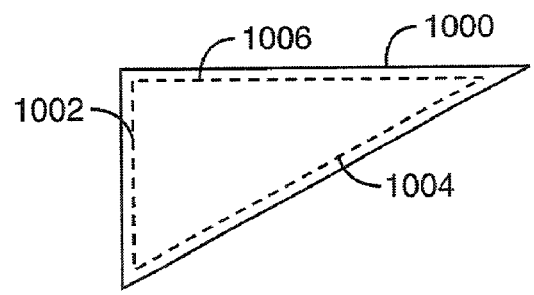
FIG. 10C is a schematic diagram illustrating a non-rectangular shape having first and second edge lists decreased, and a top edge moved within the dimensions of the original shape.

The bitmaps for the background color planes are formed by decreasing the original edge lists (step 436). In one embodiment, the first edge list 1002 is modified as illustrated in FIG. 10A (i.e., the left edge list is increased). In another embodiment, and second edge list 1004 is modified as illustrated in FIG. 10B (i.e., the right edge list is decreased). In another embodiment, both edge lists 1002, 1004 are modified as illustrated in FIG. 10C (i.e., the left edge list is increased and the right edge list is decreased). The remaining edges such as the top edge may also be modified. In one embodiment, a first predetermined number of members from each of the first and second arrays are discarded thereby moving the top edge a predetermined amount. Likewise, a predetermined number of last coordinates within each array may be discarded to move the bottom edge a predetermined amount. In another embodiment, the top and bottom edges are replicated in a different position relative to the original shape and the edge lists are modified accordingly.

Figure 7A:
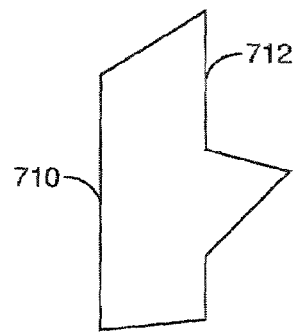
FIG. 7A is a schematic illustration of a non-rectangular shape according to one embodiment of the present invention.
Figure 7B:
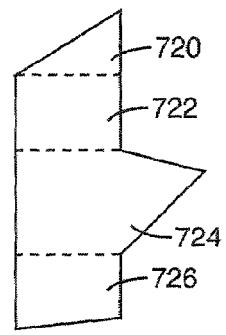
FIG. 7B is schematic diagram of one embodiment of dividing the non-rectangular shape of FIG. 7A into a plurality of subsections.
Figure 7C:
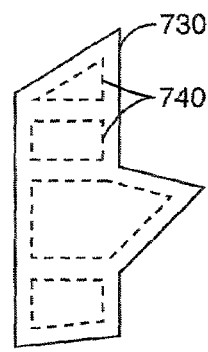
FIG. 7C is a schematic diagram of one embodiment of a non-rectangular shape comprising an original foreground and a modified background color planes according to one embodiment of the present invention.

In another embodiment of forming background color planes, a non-rectangular shape, such as that illustrated in FIG. 7A, is divided into subsections as illustrated in FIG. 7B. Subsections 722 and 726 are rectangular and are trapped in a like manner as previously described. Subsections 720 and 724 remain non-rectangular and are trapped by determining the subsection edge lists and constructing an eroded edge list that fits within the original edge list. FIGS. 7B and 7C illustrate one embodiment of the process for forming the bitmap for the background color plane using modified edge lists 740 for each of the subsections 720, 722, 724, 726. The modified edge lists 740 may be comprised of a number of non-connecting sections as illustrated in FIG. 7C. In another embodiment, the internal top and bottom edge lists are not modified such that the reduced subsections 720, 722, 724, 726 connect together to form one decreased shape that fits within the dimensions of the original edge lists.

Returning to FIG. 4, once the bitmaps for the foreground and background color planes are calculated, they are forwarded to the image forming apparatus 110, 210, 310, 410 for producing the output image.

In another embodiment of categorization, each page object is identified as being either a character, a region fill, or a non-trapped object. The character objects are trapped in the same manner as previously explained. Region fill objects are defined by their dimensions. Region fill objects may further be subdivided as rectangles which are identified by their height and width dimensions, and non-rectangular shapes which are defined by their edge lists.

In another embodiment, characters that are defined in the page description by their outlines may be categorized as a non-rectangular shape. One example of this occurrence is when the size of a character exceeds a predetermined amount. The bitmaps for the characters are determined in accordance with the non-rectangular shape calculations and the character will be subdivided into subsections.

Further calculations may be performed for each of the categories. The edge list for an object may be analyzed to determine whether the object comprises a finite area. If the area is not finite, color trapping may not be performed. In another embodiment, trapping may not be performed if trapping results in the background color plane being reduced to zero.

The color trapping techniques included choking the background color. Additionally, the foreground color may be spread, such as by adding pels to the foreground color planes of the objects. In one embodiment, spreading adds pels to each dimension of the color plane. In another embodiment, spreading adds pels to less than each dimension, such as adding pels to only the height of a rectangle, or only the top and bottom edges of a character.

The present invention may be carried out in other specific ways than those herein set forth without departing from the scope and essential characteristics of the invention. In the embodiment illustrated, four separate image forming units are included for forming images in four separate colors. In other embodiments, color trapping is performed for forming images having two or more separate colors. Further, the image forming apparatus may form images using a variety of different techniques that are well known in the art. In one embodiment, the toner images are transferred from the photoconductive drum to a media sheet that is transported by a belt. The present embodiments are, therefore, to be considered in all respects as illustrative and not restrictive, and all changes coming within the meaning and equivalency range of the appended claims are intended to be embraced therein.

What is claimed is:

1. A method of color trapping page objects in an image forming apparatus comprising the steps of:
   a) receiving a page object in a page description at an image forming controller, the page description defining the page object as either edge lists or a bitmap;
   b) performing a first trapping technique when the page description defines the page object as the edge lists; and
   c) performing a second trapping technique when the page description defines the page object as the bitmap.

2. The method of claim 1, wherein the page object is selected from the group consisting of a rectangle, character, and non-rectangular shape.

3. A method of color trapping within an image forming apparatus comprising:
   a) receiving a request comprising a page object that is executable by a image forming controller;
   b) identifying a category of the page object as being one of a character, rectangle, and non-rectangular shape;
   c) determining that trapping is necessary for the page object; and
   d) performing trapping according to the category of the page object,
   wherein the step of identifying the category of the page object comprises identifying the character by a bitmap.

4. A method of color trapping page objects during a rasterization process comprising the steps of:
   a) receiving a page object at an image forming controller;
   b) categorizing the page object into one of a first category or a second category;
   c) when the page object is categorized into the first category, performing color trapping using edge lists of the page object; and
   d) when the page object is categorized into the second category, performing color trapping using a bitmap of the page object.

5. The method of claim 4, wherein the second category comprises characters selected from the group consisting of alphanumeric figures, symbols, and punctuation marks.

6. A method of performing color trapping of a character comprising:
   a) obtaining a bitmap of a character;
   b) producing a modified bitmap of the character;
   c) selecting either the bitmap or the modified bitmap as the foreground representation; and
   d) selecting the other of the bitmap or the modified bitmap as the background representation.

7. The method of claim 6, wherein said step of producing the modified bitmap of the character comprises the step of eroding the bitmap by removing at least one pixel from the bitmap.

8. The method of claim 7, wherein the step of eroding the bitmap comprises shifting the bitmap by at least one pixel, and performing a bitwise AND operation between the bitmap and a shifted bitmap to remove at least one pixel not contained in an overlap between the bitmap and the shifted bitmap.

9. The method of claim 7, wherein an eroded bitmap is selected as the background representation of the character.

10. The method of claim 6, wherein the step of producing a modified bitmap of the character comprises spreading the bitmap to add at least one pixel to the bitmap.

11. The method of claim 10, wherein the step of spreading the bitmap comprises shifting the bitmap by at least one pixel and performing a bitwise OR operation between the bitmap and the shifted bitmap to add the at least one pixel not contained in an overlap between the bitmap and the shifted bitmap.

12. The method of claim 10, wherein a spread bitmap is selected as a foreground representation of the character.

13. A method of performing color trapping of a character comprising the steps of:
   a) obtaining a bitmap representation of a character;
   b) producing a first modified bitmap representation of the character;
   c) producing a second modified bitmap representation of the character;
   d) selecting one of the first and second modified bitmap representations of the character as a foreground representation; and
   e) selecting the other of the first and second modified bitmap representations of the character as a background representation.

14. The method of claim 13, wherein producing either the first or second modified bitmap representations of the character comprises eroding the bitmap representation to remove at least one pixel from the bitmap representation.

15. The method of claim 13, wherein producing either the first or second modified bitmap representations of the character comprises spreading the bitmap representation to add at least one pixel to the bitmap representation.

16. A method of performing color trapping of a rectangle comprising the steps of:
   a) obtaining a height and a width of a rectangle;
   b) producing a modified height and a modified width of the rectangle;

c) selecting one of the height and the width or the modified height and the modified width as a foreground representation; and d) selecting the other of the height and the width or the modified height and modified width as a background representation.

17. The method of claim 16, wherein the step of producing the modified height and modified width of the rectangle comprises decreasing at least one of the height and the width resulting in rectangular dimensions that are smaller than the rectangle.

18. The method of claim 17, wherein the modified height and the modified width are selected as the background representation.

19. The method of claim 16, wherein the step of producing the modified height and the modified width comprises increasing at least one of the height and the width resulting in increased rectangular dimensions that are larger than the rectangle.

20. The method of claim 19, wherein the increased rectangular dimensions are selected as the foreground representation of the character.

21. A method of performing color trapping of a rectangle comprising the steps of:
a) obtaining a height and a width of a rectangle;
b) producing a first dimension of the rectangle comprising a first modified height and a first modified width;
c) producing a second dimension of the rectangle comprising a second modified height and a second modified width of the rectangle;
d) selecting one of the first dimension and the second dimension as a foreground representation of the rectangle; and
e) selecting the other of the first dimension and the second dimensions as a background representation of the rectangle.

22. The method of claim 21, wherein producing either the first dimension or the second dimension of the rectangle comprises choking an overall size of the rectangle by shrinking at least one of the height and the width.

23. The method of claim 21, wherein producing either the first dimension or the second dimension of the rectangle comprises spreading an overall size of the rectangle by expanding at least one of the height and the width.

24. A method of performing color trapping of a non-rectangular shape comprising:
a) obtaining edge lists representing a non-rectangular shape;
b) producing modified edge lists representing the non-rectangular shape;
c) selecting either the edge lists or the modified edge lists as the foreground representation; and
d) selecting the other of the edge lists or the modified edge lists as the background representation.

25. The method of claim 24, wherein the edge lists comprises an array of first coordinates and an array of second coordinates, the step of producing the modified edge lists comprises altering at least one of the array of first coordinates or the array of second coordinates.

26. The method of claim 24, wherein the edge lists define a region and the step of producing the modified edge lists comprises reducing the region.

27. The method of claim 24 wherein the edge lists comprises an array of first coordinates and an array of corresponding second coordinates spaced apart by a given distance, the step of producing the modified edge lists comprises decreasing the given distance between the array of first coordinates and the array of second coordinates.

28. The method of claim 27, further comprising removing a predetermined number of corresponding members from each of the first array and the second array.

29. The method of claim 24, wherein the modified edge lists are selected as the background representation of the character.

30. The method of claim 24, wherein the edge lists comprises an array of first coordinates and an array of corresponding second coordinates spaced apart by a given distance, the step of producing the modified edge lists comprises increasing the given distance between the array of first coordinates and the array of second coordinates.

31. The method of claim 30, further comprising adding a predetermined number of the first and second coordinates to each of the first array and the second array.

32. The method of claim 24, wherein the step of producing the modified edge lists comprises dividing the non-rectangular shape into a plurality of subsections and obtaining subsection edge lists for each of the plurality of subsections.

33. The method of claim 32, wherein the edge lists for each of the plurality of subsections are increased in an area and accumulated to form a foreground representation of the character.

34. The method of claim 32, wherein the edge lists for each of the plurality of subsections are decreased in an area and accumulated to form a background representation of the character.

35. The method of claim 32, wherein the non-rectangular shape is divided into at least one rectangle and a remaining number of non-rectangular subsections.

36. The method of claim 24, wherein the edge lists define a region and the step of producing the modified edge lists comprises expanding the region.

37. The method of claim 24, wherein the modified edge lists are selected as the background representation of the character.

38. A method of performing color trapping of a non-rectangular shape comprising the steps of:
a) obtaining edge lists representing a non-rectangular shape;
b) producing first modified edge lists representing the non-rectangular shape;
c) producing second modified edge lists representing the non-rectangular shape;
d) selecting one of the first and second modified edge lists of the non-rectangular shape as a foreground representation; and
e) selecting the other of the first and second modified edge lists of the non-rectangular shape as a background representation.

39. The method of claim 38, wherein producing either the first or second modified edge lists of the non-rectangular shape comprises decreasing the non-rectangular shape.

40. The method of claim 38, wherein producing either the first or second modified edge lists of the non-rectangular shape comprises increasing the non-rectangular shape.

* * * * *